INVENTORS.
ROBERT L. BRONNES
RAY C. HUGHES
RICHARD C. SWEET

AGENT 3,371,406
HERMETIC ELECTRICAL LEAD-IN ASSEMBLY
Robert L. Bronnes, Irvington, Richard C. Sweet, North Tarrytown, and Ray C. Hughes, Ossining, N.Y., assignors to North American Philips Company, Inc., New York, N.Y., a corporation of Delaware
Continuation-in-part of application Ser. No. 301,866, Aug. 13, 1963. This application Nov. 26, 1965, Ser. No. 510,017
4 Claims. (Cl. 29—473.1)

This application is a continuation-in-part of application Ser. No. 301,866 filed Aug. 13, 1963.

This invention relates to an hermetic electrical lead-in assembly and method of making the same. More particularly, the invention relates to a method of forming a hermetic seal between a metal conductor and a tubular ceramic member.

In our co-pending application, we have described a technique for making a hermetic seal between non-metals or between a non-metal and a metal, in which an active metal such as molybdenum, tungsten, manganese, iron, cobalt or nickel is sputtered onto the surface of the non-metal, for example a ceramic such as alumina. This metal layer is then covered with a metal of the platinum group which protects the more active metal against oxidation and permits the metallized non-metal surface to be brazed to a metal.

Although this metallization will withstand the erosive action of the molten copper, we have found it advantageous to apply a final metal coating of stainless steel to provide an improved compatability with respect to the braze alloy between the metallized ceramic and the metal to which it is to be joined.

Thus, in accordance with our invention, a tubular ceramic member is metallized by cathodic sputtering with successive layers of titanium, platinum and stainless steel. The metallized ceramic is then assembled with suitable metal parts, all of which are then brazed together with copper, or other suitable braze metal or alloy in vacuum, hydrogen, cracked ammonia, or other non-oxidizing atmosphere by heating to the melting point of the braze metal.

Figure 1:
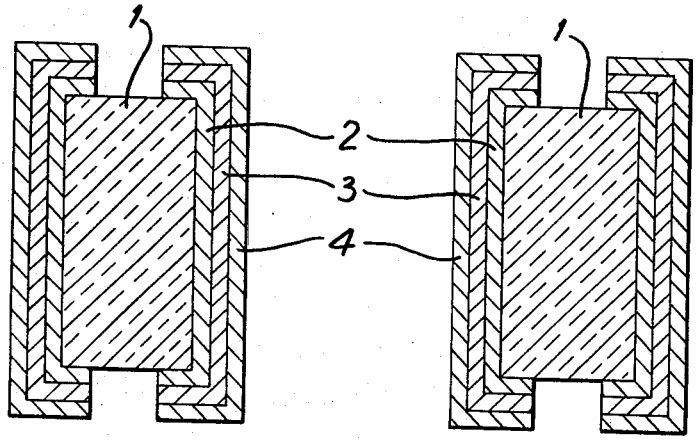
Figure 2:
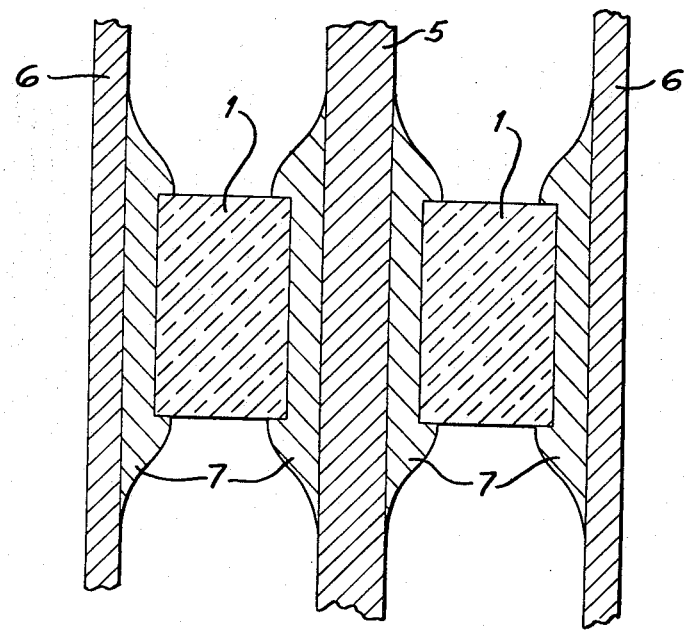

The invention will be described with greater particularity with reference to the accompanying drawing in which FIG. 1 shows in cross-section a portion of a cylindrical metallized ceramic body just prior to assembly with other metallic members; and, FIG. 2 shows in section a portion of a coaxial hermetic electrical lead-in assembly.

In the manufacture of coaxial seals useful as electrical lead-ins for evacuated or hermetically sealed devices, a section of ceramic 1 of tubular geometry is metallized by cathodic sputtering with successive layers of titanium 2, platinum 3 and stainless steel 4, as shown in FIG. 1. The details and manner in which the successive layers are cathodically sputtered onto the ceramic are described in greater detail in the parent application, Ser. No. 301,866.

The metal deposit may be excluded from certain areas by mechanical masking or alternatively may be removed from those areas in which metal is not desired by grinding, abrasion or etching. A metal member 5 is inserted into the center hole of the metallized ceramic and an external member 6 of stainless steel is positioned around the ceramic. The braze metal 7 is placed at the desired joint areas and the assembly heated in a non-oxidizing atmosphere such as hydrogen, cracked ammonia, or a vacuum to a temperature slightly in excess of the melting point of the braze metal, or alloy, and is heated at this temperature for a sufficient time to allow melting, wetting, and flow of the braze metal over the desired surfaces. The temperature is then lowered and the thus formed seal assembled into various devices by subsequent brazing at temperatures up to that which has been used for brazing the metallized ceramics to metal members.

The invention is not restricted to the particular materials described herein. Thus the internal conductor may be molybdenum or tungsten and the outer member stainless steel or low carbon steel and the braze metal copper, gold, nickel-gold alloys, and the like.

Therefore, while the invention has been described in reference to particular examples and applications thereof, it is not limited thereto as other modifications will be apparent to those skilled in the art. Consequently, the invention, as defined in the appended claims, should be given the broadest interpretation consistent with the art.

What is claimed is:

1. A method of hermetically sealing a meal to a ceramic comprising the steps of applying to the ceramic by cathodic sputtering successive layers of titanium, platinum, and stainless steel, and copper brazing the thus metallized surface of the ceramic to the metal part.

2. A method as claimed in claim 1 in which the brazing is carried out in a non-oxidizing atmosphere.

3. A method as claimed in claim 2 in which the atmosphere is hydrogen or cracked ammonia.

4. A method as claimed in claim 1 in which the brazing is carried out in vacuum.

References Cited

UNITED STATES PATENTS

| | | | |
|---|---|---|---|
| 2,857,663 | 10/1958 | Beggs | 29—473.1 |
| 2,859,512 | 11/1958 | Dijksterhois et al. | 29—473.1 |
| 2,996,401 | 8/1961 | Welch et al. | 29—473.1 X |
| 3,023,492 | 3/1962 | Bristow | 29—473.1 X |
| 3,107,756 | 10/1963 | Gallet | 29—473.1 X |
| 3,132,044 | 5/1964 | Pearsall | 29—473.1 X |
| 3,171,519 | 3/1965 | Nolte | 29—473.1 X |
| 3,289,291 | 12/1966 | Reed | 29—473.1 |

JOHN F. CAMPBELL, *Primary Examiner.*

JOHN L. CLINE, *Assistant Examiner.*